(12) United States Patent
Lindoff et al.

(10) Patent No.: US 10,009,900 B2
(45) Date of Patent: Jun. 26, 2018

(54) SELECTION OF SCHEDULING POLICY FOR NETWORK COMMUNICATIONS LINKS AND D2D COMMUNICATIONS LINKS

(71) Applicant: Telefonaktiebolaget L M Ericsson (publ), Stockholm (SE)

(72) Inventors: Bengt Lindoff, Bjärred (SE); Gabor Fodor, Hässelby (SE); Muhammad Kazmi, Bromma (SE); Stefan Parkvall, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 35 days.

(21) Appl. No.: 14/784,265

(22) PCT Filed: Dec. 3, 2013

(86) PCT No.: PCT/EP2013/075416
§ 371 (c)(1),
(2) Date: Oct. 13, 2015

(87) PCT Pub. No.: WO2014/180519
PCT Pub. Date: Nov. 13, 2014

(65) Prior Publication Data
US 2016/0081073 A1    Mar. 17, 2016

Related U.S. Application Data

(60) Provisional application No. 61/821,093, filed on May 8, 2013.

(51) Int. Cl.
*H04W 72/04* (2009.01)
*H04W 72/12* (2009.01)
(Continued)

(52) U.S. Cl.
CPC ..... *H04W 72/048* (2013.01); *H04W 72/1215* (2013.01); *H04W 72/1257* (2013.01);
(Continued)

(58) Field of Classification Search
CPC ........... H04W 52/383; H04W 72/1257; H04W 52/146; H04W 52/18; H04W 72/042;
(Continued)

(56) References Cited

U.S. PATENT DOCUMENTS 6,097,762 A    8/2000  Suzuki et al.
6,606,500 B1   8/2003  Kronestedt
(Continued)

FOREIGN PATENT DOCUMENTS

WO    2009/009264 A2    1/2009
WO    2012034269 A1     3/2012
WO    2012/049351 A1    4/2012

OTHER PUBLICATIONS

Fodor, G. et al.,"A Distributed Power Control Scheme for Cellular Network Assisted D2D Communications," IEEE 2011 Global Telecommunications Conference (GLOBECOM 2011), Dec. 5, 2011, pp. 1-6, XP032118739, doi: 10.1109/GLOCOM.2011.6133537; ISBN: 978-1-4244-9266-4.
(Continued)

*Primary Examiner* — Hassan Kizou
*Assistant Examiner* — Roberta A Shand
(74) *Attorney, Agent, or Firm* — Sage Patent Group (57) ABSTRACT

A network node (310) comprising a radio frequency communications interface (230) and a controller (210), said network node (310) being configured to service at least one first radio frequency communication device (320) being configured for both network communication and for device-to-device communication with a second radio frequency communication device (325), wherein said controller (210)
(Continued)

is configured to determine if a restriction of a scheduling policy is necessary for said first radio frequency communication device (320), select a scheduling policy accordingly. The controller is further configured to allocate communication resources according to said selected scheduling policy to said first radio frequency communication device (320). The scheduling policy is one which enables simultaneous network communication and device-to-device communication in said same transmission time interval (A, B, C, D, E) or one which enables either network communication or device-to-device communication in said same transmission time interval.

22 Claims, 7 Drawing Sheets

(51) Int. Cl.
   *H04W 88/04* (2009.01)
   *H04W 88/06* (2009.01)
   *H04W 88/10* (2009.01)
   *H04W 76/14* (2018.01)

(52) U.S. Cl.
   CPC ............ *H04W 76/14* (2018.02); *H04W 88/04* (2013.01); *H04W 88/06* (2013.01); *H04W 88/10* (2013.01)

(58) Field of Classification Search
   CPC   H04W 72/048; H04W 72/1215; H04W 72/10
   See application file for complete search history.

(56) References Cited

U.S. PATENT DOCUMENTS

| | | | | |
|---|---|---|---|---|
| 6,680,950 | B1* | 1/2004 | Nagata | H04W 74/0816 370/445 |
| 6,707,808 | B1* | 3/2004 | Vedrine | H04W 72/0446 370/337 |
| 8,213,360 | B2 | 7/2012 | Koskela et al. | |
| 8,780,835 | B2* | 7/2014 | Hakola | H04W 74/008 370/245 |
| 8,838,046 | B2* | 9/2014 | Fu | H04B 1/406 455/67.13 |
| 8,913,579 | B2 | 12/2014 | Zou et al. | |
| 8,989,093 | B2* | 3/2015 | Han | H04W 72/00 370/328 |
| 9,030,984 | B2 | 5/2015 | Yang et al. | |
| 9,173,124 | B2* | 10/2015 | Heo | H04W 52/0225 |
| 9,380,481 | B2* | 6/2016 | Narasimha | H04W 24/10 |
| 2002/0090088 | A1 | 7/2002 | Onishi | |
| 2004/0240404 | A1 | 12/2004 | Ibrahim et al. | |
| 2008/0069039 | A1 | 3/2008 | Li et al. | |
| 2009/0017829 | A1 | 1/2009 | Laroia et al. | |
| 2009/0046596 | A1 | 2/2009 | Ewe et al. | |
| 2009/0318087 | A1 | 12/2009 | Mattila et al. | |
| 2009/0325625 | A1* | 12/2009 | Hugl | H04W 52/16 455/522 |
| 2010/0093364 | A1 | 4/2010 | Ribeiro et al. | |
| 2010/0189046 | A1 | 7/2010 | Baker et al. | |
| 2011/0255450 | A1 | 10/2011 | Wang et al. | |
| 2011/0268004 | A1 | 11/2011 | Doppler et al. | |
| 2011/0274092 | A1 | 11/2011 | Liu et al. | |
| 2011/0275382 | A1 | 11/2011 | Hakola et al. | |
| 2011/0287794 | A1* | 11/2011 | Koskela | H04W 28/08 455/509 |
| 2011/0300892 | A1 | 12/2011 | Hakola et al. | |
| 2012/0028663 | A1 | 2/2012 | Nejatian et al. | |
| 2012/0051315 | A1 | 3/2012 | Wang et al. | |
| 2012/0093098 | A1 | 4/2012 | Charbit et al. | |
| 2012/0122467 | A1 | 5/2012 | Auer et al. | |
| 2012/0129540 | A1* | 5/2012 | Hakola | H04W 72/042 455/450 |
| 2012/0163252 | A1 | 6/2012 | Ahn et al. | |
| 2012/0250636 | A1 | 10/2012 | Wang et al. | |
| 2013/0059583 | A1 | 3/2013 | Van Phan et al. | |
| 2013/0128858 | A1 | 5/2013 | Zou et al. | |
| 2013/0150058 | A1 | 6/2013 | Lim et al. | |
| 2013/0157676 | A1* | 6/2013 | Baek | H04W 72/0486 455/452.1 |
| 2013/0230032 | A1 | 9/2013 | Lu et al. | |
| 2015/0016410 | A1* | 1/2015 | Lee | H04L 1/18 370/330 |
| 2015/0146687 | A1* | 5/2015 | Kim | H04W 76/023 370/331 |
| 2016/0066356 | A1 | 3/2016 | Lindoff et al. | |
| 2016/0081073 | A1* | 3/2016 | Lindoff | H04W 72/1257 370/329 |

OTHER PUBLICATIONS

Doppler, K. et al., "Device-to-Device Communications; Functional Prospects for LTE-Advanced Networks," IEEE 2015 International Conference on Communications Workshop, Jun. 14, 2009, pp. 1-6, XP031212460; ISBN: 978-1-424-3437-4.

Hongnian, Xing et al., "The Investigation of Power Control Schemes for Device-to-Device Communication Integrated into OFDMA Cellular System," IEEE 21st International Symposium on Personal Indoor and Mobile Radio Communications (PIMRC), Istanbul, Turkey, Sep. 26-30, 2010, pp. 1775-1780, XP031837914, ISBN: 978-1-4244-8017-3.

International Search Report issued in corresponding International application No. PCT/EP2013/075416, date of completion of the search May 20, 2014.

Written Opinion of the International Searching Authority issued in corresponding International application No. PCT/EP2013/075416, dated Mar. 27, 2014.

Fodor, Gábor, et al., "Design Aspects of Network Assisted Device-to-Device Communications," IEEE Communications Magazine, May 2011.

Xiaogang, Ran et al. "D2D Resource Allocation under the Control of BS," University of Electronic Science and Technology of China, 2013, https://mentor.ieee.org/802.16/dcn/13/16-13-0123-01-000n-d2d-resource-allocation-under-thecontrol-of-bs.docx.

Zulhasnine, Mohammad et al. "Efficient Resource Allocation for Device-to-Device Communication Underlying LTE Network," 2010 IEEE 6th International Conference on Wireless and Mobile Computing, Networking and Communications.

Yu, Chia-Hao et al., "Power Optimization of Device-to-Device Communication Underlaying Cellular Communication," in Proceedings of IEEE International Conference on Communications, Jun. 2009, pp. 1-5.

Lee, Namyoon et al. "Power Control for D2D Underlaid Cellular Networks: Modeling, Algorithms and Analysis". JSAC on D2D Communications. May 2013.

Belleschi, Marco et al, "Performance Analysis of a Distributed Resource Allocation Scheme for D2D Communications," GLOBECOM Workshops 2011, pp. 358-362.

Phunchongharn, Phond et al. "Resource Allocation for Device-to-Device Communications Underlying LTE-Advanced Networks", IEEE Wireless Communication, Sep. 2012.

3GPP, "3rd Generation Partnership Project; Technical Specification Group Services and System Aspects; Feasibility study for Proximity Services (ProSe), Release 12," 3GPP TR 22.803, V12.1.0 (Mar. 2013).

International Search Report issued in corresponding International application No. PCT/EP2013/075400, date of completion of the search May 23, 2014.

Written Opinion of the International Searching Authority issued in corresponding International application No. PCT/EP2013/075400, dated Jul. 29, 2014.

International Search Report issued in corresponding International application No. PCT/EP2013/075415, date of completion of the search Jul. 25, 2014.

(56) References Cited

OTHER PUBLICATIONS

Written Opinion of the International Searching Authority issued in corresponding International application No. PCT/EP2013/075415, dated Jul. 31, 2014.
Office Action in related U.S. Appl. No. 14/784,266 dated May 19, 2016.
Office Action in related U.S. Appl. No. 14/784,266 dated Oct. 20, 2016.
Office Action dated Feb. 24, 2017 in related U.S. Appl. No. 14/784,267.
Office Action dated Sep. 13, 2017 in related U.S. Appl. No. 14/784,267.

* cited by examiner

SELECTION OF SCHEDULING POLICY FOR NETWORK COMMUNICATIONS LINKS AND D2D COMMUNICATIONS LINKS

TECHNICAL FIELD

This application relates to a method, a network node, a communication device, and a computer-readable storage medium for improved communication scheduling, and in particular to a method, a network node, a communication device and a computer-readable storage medium for improved selection of scheduling policy for uplink and/or downlink and device-to-device communications links in network assisted device-to-device communication networks.

BACKGROUND

The present invention relates to Device-to-Device (D2D) Communications in the Cellular Spectrum. Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because the non-orthogonal resource sharing between the cellular and the D2D layers has the potential of the reuse gain and proximity gain at the same time increasing the resource utilization, D2D communications underlying cellular networks has received considerable interest in the recent years.

Specifically, in 3GPP LTE networks, such LTE Direct (D2D) communication can be used in commercial applications, such as cellular network offloading, proximity based social networking, or in public safety situations in which first responders need to communicate with each other and with people in the disaster area.

D2D communication entities using an LTE Direct link may reuse the same physical resource blocks (PRB) as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D (LTE Direct) communications takes place in the cellular DL spectrum or in DL time slots. For ease of presentation, in the present disclosure we assume that D2D links use uplink resources, such as uplink PRBs in an FDD or uplink time slots in an a cellular TDD system, but the main ideas would carry over to cases in which D2D communications take place in DL spectrum as well.

Simultaneous D2D and Cellular Transmissions in D2D Communications

Figure 3:
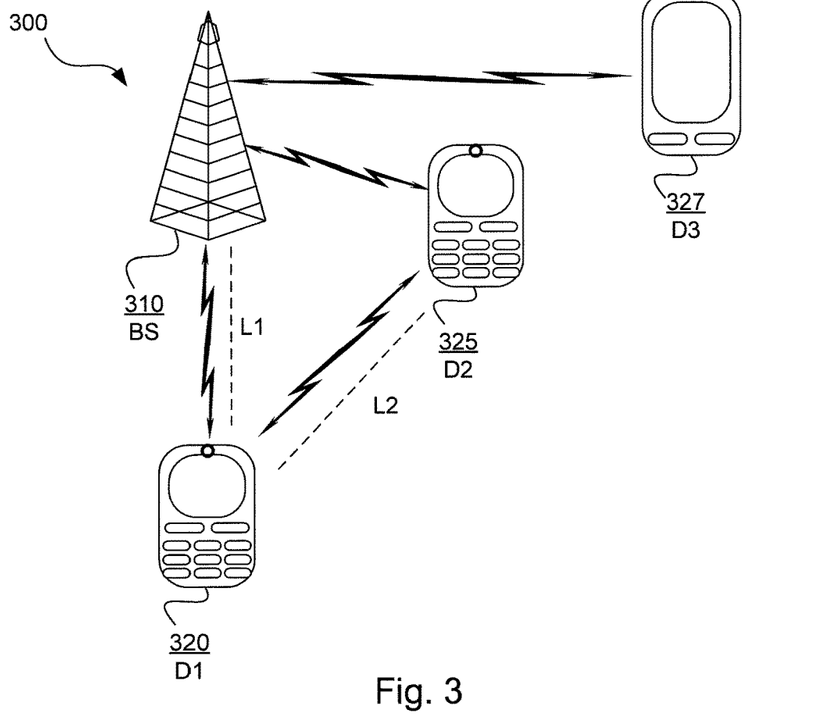
FIG. 3 shows a schematic view of a communication network comprising a communication device according to one embodiment of the teachings of this application.

FIG. 3 shows a principal schematic sketch over a network assisted D2D system. One or more network nodes 310 are in control over at least one RF communication device 320, 325 and 327 (also referenced D1, D2 and D3), of which at least two (320 D1 and 325 D2) are also is involved with D2D communication with each other. The network node 310 allocates time-frequency resources for D2D transmission, and is also in control over maximum allowed transmission (TX) power used in the D2D communication. In a typical scenario, the network node 310 allocates D2D resources for approximately 200-500 ms and during that time period, then each RF communication device 320, 325 makes autonomous selections of MCS (modulation and coding scheme) and executes procedures such as HARQ (hybrid automatic repeat request). At the end of each time period, the RF communication device 320 reports signal quality status and/or other transmission quality measures, and receives new D2D resources to use for the next time period (i.e. 200-500 ms).

Furthermore, typically UpLink (UL) spectrum/resources are used for D2D, as this is beneficial from an interference control perspective. And, as D2D communication will typically not take up too much of the spectrum resources into account, it is far from efficient to allocate an entire frequency bandwidth in a sub frame for D2D communication. Hence, both UL traffic and D2D traffic need to able to share the same sub frames, for example sharing a frequency. This also means that, for optimized spectrum usage, a first RF communication device might be able to transmit to the network node 310 and to a second RF communication device 325 in the same sub frame.

Figure 5:
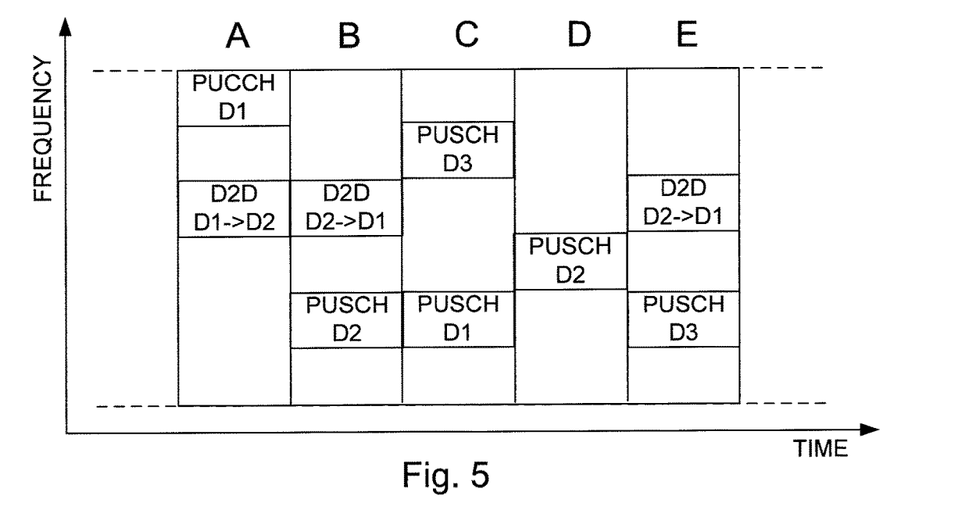
FIG. 5 shows a series of time blocks for a RF communication device transmitting both to a network node and to another RF communication device according to an embodiment of the teachings of this application.

FIG. 5 shows an example of how simultaneous cellular and D2D allocation in the UL can be made. In time block or time period A, the first RF communication device 325 D1 transmits D2D and simultaneously a physical UL control channel (PUCCH) to the network node 310. In time period B, the second RF communication device 325 D2 transmits a physical UL shared channel (PUSCH) to the network node 310 and simultaneously to the first RF communication device 320 D1. In time period C, both the first RF communication device 320 D1 and the third RF communication device 327 D3 transmit a PUSCH respectively to the network node 310. In time period D, the second RF communication device 325 D2 transmits a physical UL shared channel (PUSCH) to the network node 310, while in time period E, the second RF communication device 325 D2 transmit to the first RF communication device 325 D1 in D2D and the third RF communication device 327 D3 transmit a PUSCH to the network node 310.

The transmit modulation quality of a RF communication devices RF communication interface, such as a UE (User equipment) radio transmitter, defines the modulation quality for expected in-channel RF transmissions from the UE. In related communication standards, products or requirement specifications, the transmit modulation quality is typically specified in terms of:

Error Vector Magnitude (EVM) for the allocated resource blocks (RBs);

EVM equalizer spectrum flatness derived from the equalizer coefficients generated by the EVM measurement process;

Carrier leakage (caused by IQ offset, i.e. a mismatch between the gain in the radio receiver paths for the In-phase (I) and the Qadrature phase); or In-band emissions for the non-allocated RB.

The modulation quality depends upon factors such as modulation order (quadrature phase-shift keying (QPSK), 16 quadrature amplitude modulation (QAM) etc), transmitter output power, frequency of operation etc.

The Error Vector Magnitude is a measure of the difference between the reference waveform and the measured waveform. This difference is called the error vector.

The EVM equalizer spectrum flatness is defined in terms of the maximum peak-to-peak ripple of the equalizer coefficients (dB) across the allocated uplink block. The basic measurement interval is the same as for EVM.

Carrier leakage (the IQ origin offset) is an additive sinusoid waveform that has the same frequency as the modulated waveform carrier frequency. The relative carrier leakage power is a power ratio of the additive sinusoid waveform and the modulated waveform.

In LTE, the in-band emission is defined as the average across 12 sub-carriers and as a function of the RB offset from the edge of the allocated UL transmission bandwidth. The in-band emission is measured as the ratio of the UE output power in a non-allocated RB to the UE output power in an allocated RB.

Location Services in Cellular (3GPP) Networks

The position of a RF communication device being arranged with location-based services, hereafter the target device, is determined by using one or more positioning measurements, which can be performed by a suitable measuring node or the target device. Depending upon the positioning method used the measuring node can either be the target device itself, a separate radio node (i.e. a stand-alone node), serving nodes of the target device and/or neighboring nodes of the target device etc. Also, depending upon the positioning method, the measurements can be performed by one or more types of measuring nodes. Some well-known positioning techniques exist in cellular systems (such as LTE), such as satellite based methods, Observed Time Difference Of Arrival (OTDOA), Uplink Time Difference Of Arrival (UTDOA), Enhanced cell ID (E-CID), and hybrid methods which rely on positioning measurements related to more than one positioning methods for determining the position of the target device. For example a hybrid method may use A-GNSS measurements and OTDOA RSTD measurements for determining the position of the target device.

Problems with Existing Solutions

The scheduling flexibility requirement desired and discussed above, (namely that a device simultaneously should be able to transmit to a Network node 310 and to another device in the same sub frame) gives rise to the following problems.

One problem is that the total TX power may not be sufficient for maintaining simultaneous transmission with sufficient quality. Since the RF communication devices of a D2D pair are typically in close proximity to each other, a low TX power is typically needed in the D2D communication. However, the RF communication device might be far away from the network node 310 and therefore it might need high TX power for transmission to the network node 310. In fact, D2D communication reusing cellular PRBs is typically expected to take place between RF communication devices that are close to one another but sufficiently far from a network node such as a base station (eNB).

Another problem lies in that since the device transmitter or RF communication device's RF interface, especially the power amplifier (PA), is not ideal, due to non-linearities; the transmission on a first set of Resource Blocks (RBs) gives rise to spectral emission on adjacent RBs within the system frequency band.

Figure 6A:
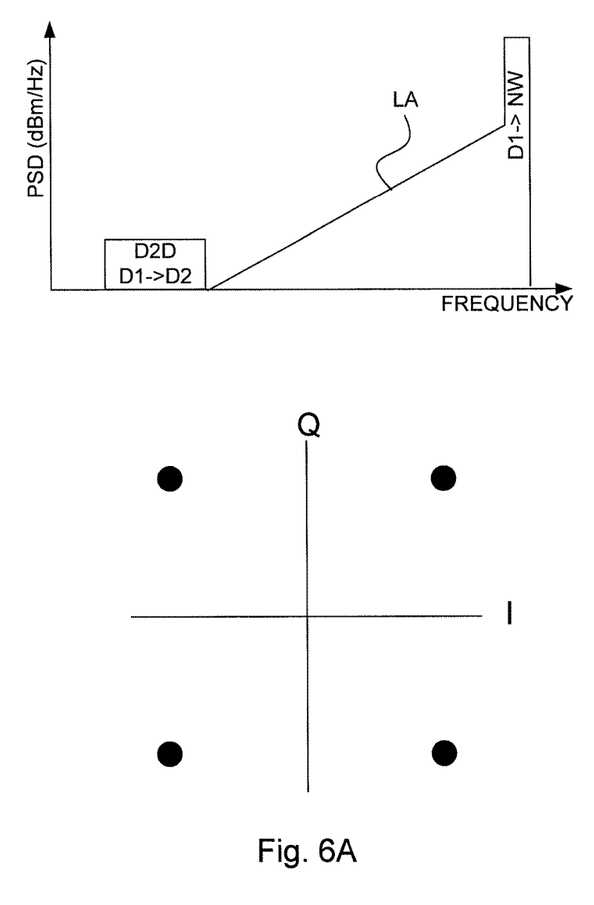
FIGS. 6A and 6B illustrate a problem occurring in the prior art.

FIGS. 6A and 6B illustrate a problem that may arise due to this in-band emission. In FIG. 6A, showing a time period A (referring to time period A in FIG. 5), the first RF communication device 320 D1 transmits a PUCCH to the network node 310 (referenced D1->NW) and at the same time also in D2D mode to the second RF communication device 325 D2 (referenced D1->D2). Assuming the PUCCH is transmitted with higher power than the D2D part (due to e.g. path loss differences or different SINR (Signal-to-Noise-and-Interference-Ratio) targets), the D2D transmission may be affected by TX leakage (referenced LA) from the PUCCH transmission. However, in this case the imbalance is not too large and hence TX leakage will not significantly affect the D2D transmission. This is exemplified in the D2D signal constellation (below in FIG. 6A) (assuming a QPSK signal is transmitted on one sub-carrier).

Figure 6B:
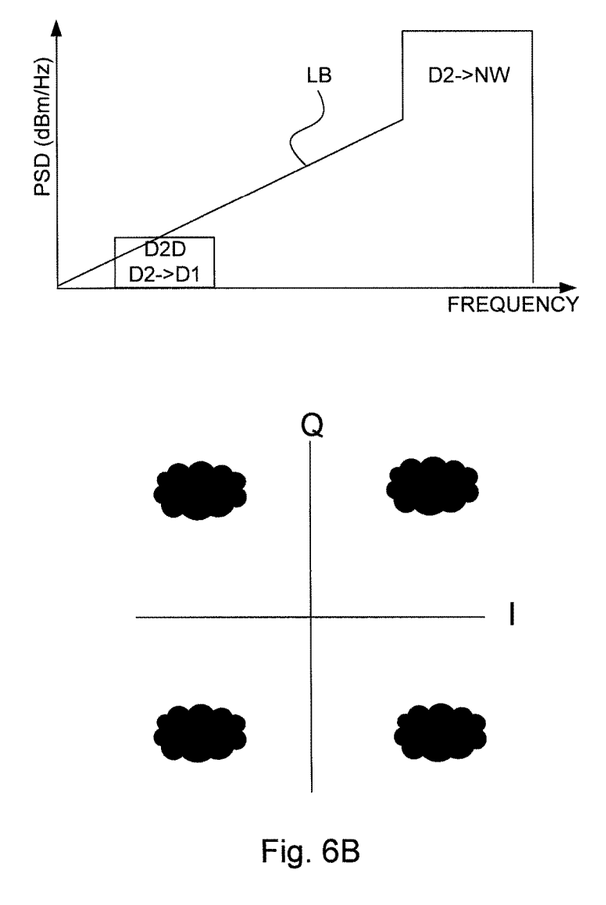

However, in FIG. 6B, showing a time period B (referring to time period B in FIG. 5), where D2 is transmitting a PUSCH (referenced D2->NW) at the same time as D2D-communicating with D1 (referenced D2->D1), the TX leakage (referenced LB) from the NW transmission severely impacts the D2D transmissions. This is seen in the signal constellation (below in FIG. 6B) where the QPSK points are blurred. The extra noise introduced in the transmitter will make the D2D transmission much more sensitive to interference in D2D reception (RX) at D1, implying a lower D2D performance etc. Since the network scheduler does not have all information about the D2D communication, for instance the distance between D2D and the amount of data transmitted between the devices (and hence TX power needed), it is hard for the network to detect such transmission (TX) imbalance scenarios.

A simple prior art method to solve this problem is to always avoid scheduling (UL and/or DL) resources to a RF communication device in a same sub frame as ongoing D2D communication. However, as mentioned above, such approach will significantly reduce spectrum usage and spectrum capacity, since in the existing approach only a subset of the frequency resources are utilized within a subframe.

Therefore, there is a need for a method and a RF communication device that takes care of problems as described above without wasting resources.

SUMMARY

The problem, that the inventors has realized after inventive and insightful reasoning and that the present invention aims to solve, arises in situations when a RF communication device in so called network (NW) assisted device-to-device (D2D) mode simultaneously transmits data to both another RF communication device (D2D peer device) and to a network node, such as a cellular base station (BS) or access point (AP). In such situations, large transmission power imbalance may happen, and this is likely to cause problems via, for example, spectral emission in resource blocks (RB) other those RBs that the RF communication device is actually scheduled to transmit in. Another problem is related to the total transmission (TX) power required for the simultaneous transmission to the peer device and to the BS in power limited (e.g. cell edge situations). The root cause to both of these problems has been identified, after careful and inventive reasoning, to be the simultaneous cellular and peer D2D transmission specific to cellular NW assisted D2D communications.

It is an object of the teachings of this application to overcome or at least mitigate the problems listed above by providing a network node comprising a radio frequency communications interface and a controller, said network node being configured to service at least one first radio frequency communication device being configured for both network communication and for device-to-device communication with a second radio frequency communication device, wherein said controller is configured to determine if a restriction of a scheduling policy is necessary for said first radio frequency communication device, select a scheduling policy accordingly, and allocate communication resources according to said selected scheduling policy to said first radio frequency communication device, wherein said scheduling policy is one which enables network communication and device-to-device communication in said same transmission time interval (A, B, C, D, E) (i.e. simultaneous) or one which enables either network communication or device-to-device communication in said same transmission time interval.

In one embodiment the radio frequency communication device is a mobile communications terminal.

In one embodiment the transmission time interval is a subframe.

It is a further object of the teachings of this application to overcome the problems listed above by providing a method for use in a network node according to above.

It is an object of the teachings of this application to overcome or at least mitigate the problems listed above by providing a radio frequency communication device comprising a radio frequency communications interface and a controller, wherein said controller is configured to establish network communication with a network node and to establish device-to-device communication with a second radio frequency communication device via said radio frequency communication interface, assess whether network communication with said network node and device-to-device communication with said second radio frequency communication device is suitable according to a scheduling policy, generate a recommendation on said scheduling policy based on said assessment and to transmit said recommendation to said network node.

It is a further object of the teachings of this application to overcome the problems listed above by providing a method for use in a radio frequency communication device according to above.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by enabling a network node managing D2D communication between D2D device (or UE) pairs of selecting and using one of the two different scheduling policies or resource assignment modes when determining the resource blocks used by RF communication devices that communicate with both a cellular base station or access point and with a peer device using network assisted D2D technology. The first scheduling policy allows physical resource blocks (PRB) to be scheduled in the same transmission time interval (TTI) for simultaneous cellular UL and or DL and D2D transmission. The second policy does not allow PRBs to be scheduled in the same TTI for simultaneous cellular and D2D transmissions.

The selection of the policy is, in one embodiment, based on one or more suitable criteria. Examples of such criteria are RF communication device capability of handling simultaneous D2D TX and NW TX transmissions, radio measurements, wireless device location, wireless device power budget (e.g. handheld regular device or power restricted sensor device, etc).

Upon selecting the suitable policy, the RF communication devices involved in D2D communication are configured with the parameters associated with the selected policy. Thus the key idea is to dynamically select the policy that addresses the power imbalance, total power budget problems and maintain high frequency resource utilization within a subframe.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
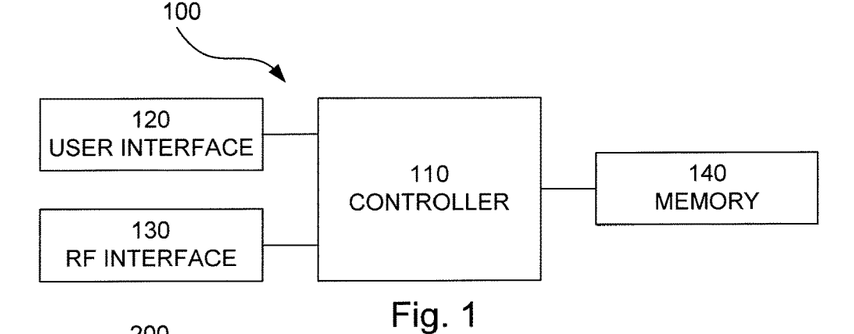
FIG. 1 shows a schematic view of a radio frequency communication device according to one embodiment of the teachings of this application.

FIG. 1 shows a schematic example of a radio frequency communication device 100 according to one embodiment of the teachings herein. In this example, the RF communication device 100 is a mobile communications terminal, such as a mobile phone, a wireless computer tablet or a laptop computer enabled for wireless communication, but it should be noted that the teachings herein are not restricted to be used in mobile communications terminals, but may be used in any RF communication device 100 that is arranged as will be disclosed herein. The RF communication device 100 may comprise a user interface 120, which in the example embodiment of FIG. 1 may comprise at least one physical key, a visual data feedback unit, such as a display or Light Emitting Diode (LED) array. The RF communication device 100 also comprises a controller 110 and a memory 140. The controller 110 may be implemented as one or several processors or other logic circuits, such as programmable logic circuits. The memory 140 may be implemented using any commonly known technology for computer-readable memories such as ROM, RAM, SRAM, DRAM, FLASH, DDR, EEPROM memory, flash memory, hard drive, optical storage or any combination thereof. The memory 140 is used for various purposes by the controller 110, such as for storing program instructions and application data.

The RF communication device 100 further comprises a radio frequency (RF) communication interface 130 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The RF interface 130 is also configured to communicate according to one or a combination of at least one of the standards IEEE 802.11 (WiFi), Bluetooth®, NFC (Near Field Communication) or other short range (radio frequency) communication interface, RFID (Radio Frequency Identification) and ZigBee.

The controller 110 is operatively connected to the RF communication interface 130 for communicating with other RF communication devices as will be disclosed below with reference to FIG. 3.

Figure 2:
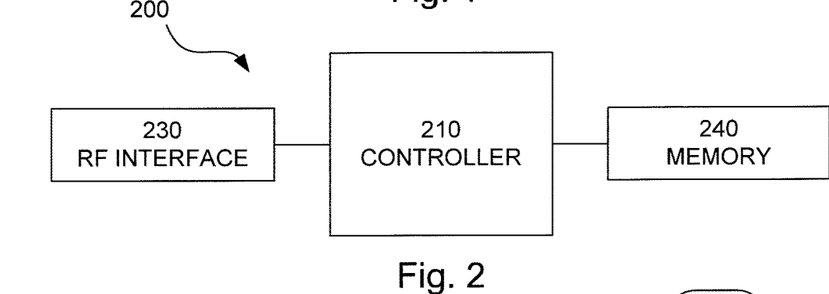
FIG. 2 shows a schematic view of a network node according to one embodiment of the teachings of this application.

FIG. 2 shows a schematic example of a network node 200 according to one embodiment of the teachings herein. In this example, the network node 200 is a base station, but it should be noted that the teachings herein are not restricted to be used in mobile communications networks, but may be used in any network that is arranged as will be disclosed herein. The network node 200 may thus be an access point. The network node 200 comprises a controller 210 and a memory 240. The controller 210 may be implemented as one or several processors or other logic circuits, such as programmable logic circuits. The memory 240 may be implemented using any commonly known technology for computer-readable memories such as ROM, RAM, SRAM, DRAM, FLASH, DDR, EEPROM memory, flash memory, hard drive, optical storage or any combination thereof. The memory 240 is used for various purposes by the controller 210, such as for storing program instructions and application data.

The network node 200 further comprises a radio frequency (RF) communication interface 230 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The RF interface 230 may alternatively be configured to communicate according to one or a combination of at least one of the standards IEEE 802.11 (WiFi), Bluetooth®, NFC (Near Field Communication) or other short range (radio frequency) communication interface, RFID (radio frequency Identification) and ZigBee, wherein the network node is an access point.

The controller 210 is operatively connected to the RF communication interface 230 for communicating with RF communication devices as will be disclosed below with reference to FIG. 3.

FIG. 3 schematically shows a radio frequency communication network 300 according to the teachings herein. A network node 310 is arranged to communicate with a first radio frequency communication device 320, such as a user equipment (UE). The network node 310 may be arranged to communicate according to a cellular communication standard, such as LTE (Long-Term evolution) or 3GPP (3G Partner project) or other commonly known radio access technology (RAT), such as disclosed with reference to FIG. 2. The network node 310 is, thus, in this example, a base station (BS). The network node 310 may additionally or alternatively be arranged to communicate according to a data communication standard, such as IEEE802.11 (WiFi™) or Bluetooth™ or other commonly known radio access technology (RAT), such as disclosed with reference to FIG. 2. The network node 310 is, thus, in this example, an access point (AP).

It should be noted that the network node 310 may be arranged to communicate according to any RAT and the teachings herein are applicable in each circumstance. A network node may be an eNode B, a node B, a Base Station, cellular access point (AP), radio network controller, or relay etc. The network node may also be an access point configured to operate according to a non-cellular RAT, such as WiFi and others as disclosed with reference to FIG. 2. The same is also naturally true for the network node 200 of FIG. 2.

The radio frequency communication network 300 may also comprise a second RF communication device 325, such as a user equipment. The first RF communication device 320 is further configured to communicate with the second RF communication device 325 (and vice versa) according to a device to device (D2D) communication standard, such as LTE Direct. The radio frequency communication network 300 is thus arranged for network assisted device-to-device communication, wherein the network node 310 is configured for network assisted device-to-device communication.

As has been explained in the background section, problems arise when a device 320 attempts to communicate both with a network node 310 and another RF communication device 325 at (substantially) the same time.

The radio frequency communication network 300 may also comprise additional RF communication devices, such as a third RF communication device 327. The third RF communication device 327 is only involved in network communication and will thus not be discussed in further detail but it should be noted that the communication effected by the third RF communication device 327 may be a cause of interference or other disturbances that the communication with the first and second RF communication devices 320, 325 is subjected to.

Figure 4:
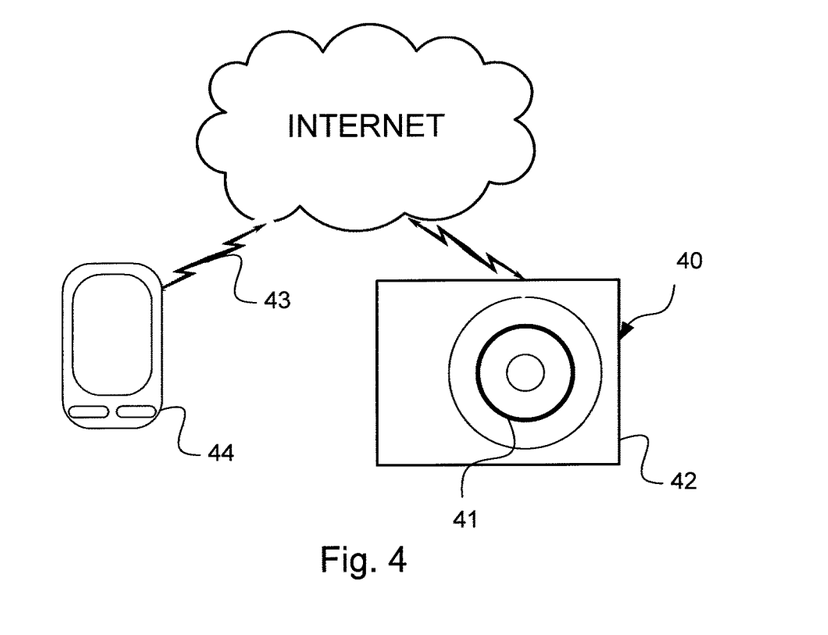
FIG. 4 shows a schematic view of a computer-readable medium according to one embodiment of the teachings of this application.

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 240 in FIG. 2) of the RF communication device 100.

References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

In one embodiment the RF communication device is configured to transmit D2D capability information to the network node 310. This device capability message related to simultaneous transmission for D2D and for network node communications may include at least one of the capabilities explained below.

(a) Information on capability of simultaneously transmitting signals for at least assisting D2D communication and to the network node for network transmission (that is cellular transmission) support.

(b) Maximum allowed D2D/network TX power imbalance handling capability of the device. For example, an indication whether it can handle simultaneous operation provided the max TX power imbalance is within certain limit e.g. 20 dB. The TX power imbalance is the maximum difference in dB scale between the transmission powers for D2D communication and for network communication that the RF communication device can handle.

(c) In-band emission level handling support (for instance in dBc relative transmitted Power Spectral Density). For example an indication whether the RF communication device 320 is capable of limiting the emission caused by its signal transmitted in used or assigned physical resources into the unused or unassigned physical resources within the system bandwidth up to certain level. The level may be pre-defined (e.g. −25 dBc) or it may also be indicated by the RF communication device 320 as part of its capability, The RF communication device 320 may signal the above capability to the network node 310 or even to another RF communication device 320 proactively or in response to receiving a request from the network node 310 or recipient device intended to receive the capability.

In one additional or alternative embodiment the network node 310 may obtain any of the above capability of the RF communication device 320 by implicit means. This can be done for example based on historical data e.g. radio performance of transmitted signals in unused resources, declared capability by manufacturers for certain type of devices etc.

In an alternative or additional embodiment, the device capabilities as referenced (a)-(c) above can be obtained from subscription data when such subscription data is available or can be made available at the network node 310. For example, the default device capabilities in categories (a)-(c) can be associated with the device identity.

Figure 7A:
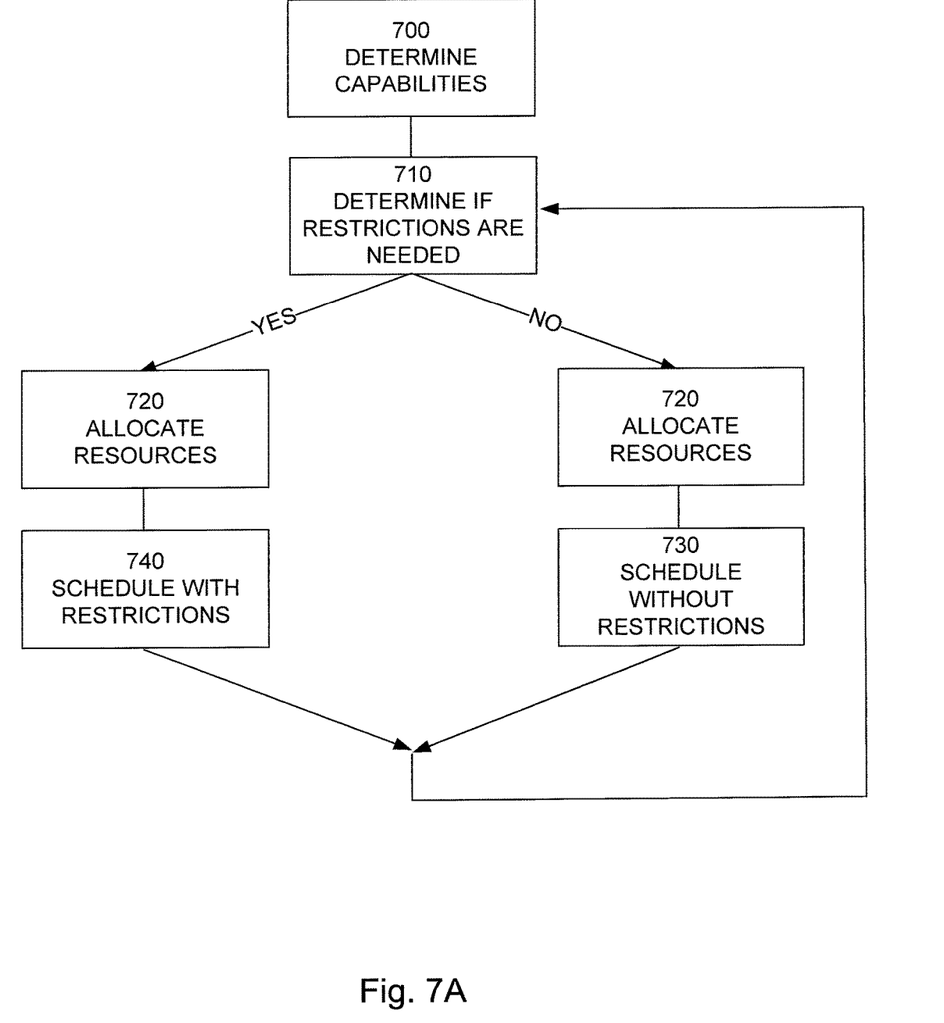
FIGS. 7A, 7B, 7C and 7D each shows a flow chart for a general method according to an embodiment of the teachings of this application.

FIG. 7A shows a flow chart for a general method according to an embodiment of the teachings of this application. After the network node 310 has determined the capabilities of the RF communication devices 320, 325, possibly by receiving them or through implicit determinations 700, the network node 310 is arranged to execute a selection mechanism of scheduling policy based on RF communication device capability information, by determining whether UL scheduling resource restrictions are needed for the first RF communication device 320 710. This may, for instance, be based on acquired capability information if the RF communication device does not support simultaneous D2D and network transmission, then such restriction is (trivially) not needed. For such RF communication devices, the network node 310 is arranged to configure resources according to a second scheduling policy. If the device is capable of simultaneous transmission to a peer device and to a network node, but it has sufficient power headroom for both transmissions and has capability to handle power imbalance, then such restriction is not needed either.

In another example, if the RF communication device 320 has the capability of handling simultaneous D2D and network communications (i.e. any of the capability) then the network node 310 may select the scheduling policy depending upon the load in the cell in terms of number of users served by the network node 310 in its cell. For example the number of users can be the number of D2D capable RF communication devices operating in D2D mode and/or non-D2D capable RF communication devices currently operating and/or D2D capable RF communication devices operating in non-D2D communication mode. If the number of total users is above a threshold (e.g. 50% or more of the total cell capacity) then the network node 310 may use the second scheduling policy for the D2D capable RF communication device (i.e. first device). In this way the resources can be more efficiently utilized. On the other hand, at low load in terms of number of users in a cell the first scheduling policy is used.

In such a case (FIG. 7A, NO branch), the network node 310 allocates 720 D2D f/t-resources for the (at least) first RF communication device 320 during a time period T. Subsequently, the network node 310 schedules 730 UL and/or DL resources to the D2D RF communication device 320 for the transmission of PUSCH or PUCCH to the network node 310 according to a first scheduling policy that may include possibility for scheduling UL and/or DL resources in the same sub frame as allocated D2D resources to the first RF communication device 320.

In case a restriction is needed (FIG. 7A YES branch), then the network node 310 allocates 720 D2D f/t-resources for the (at least) first RF communication device 320 during a time period. The network node 310 also schedules UL and/or DL 740 resources to the D2D RF communication device 320 according to a second scheduling policy. According to this scheduling policy, the network node 310 schedules UL and/or DL resources in a sub frame in a time division multiplexing (TDM) fashion in relation to the allocated D2D resources to the first RF communication device 320. In another embodiment, the second scheduling policy includes a possibility to schedule simultaneous D2D and PUCCH resources but not PUSCH resources in a sub frame in TDM fashion in relation to the allocated D2D resources to the first RF communication device 320.

Figure 7B:
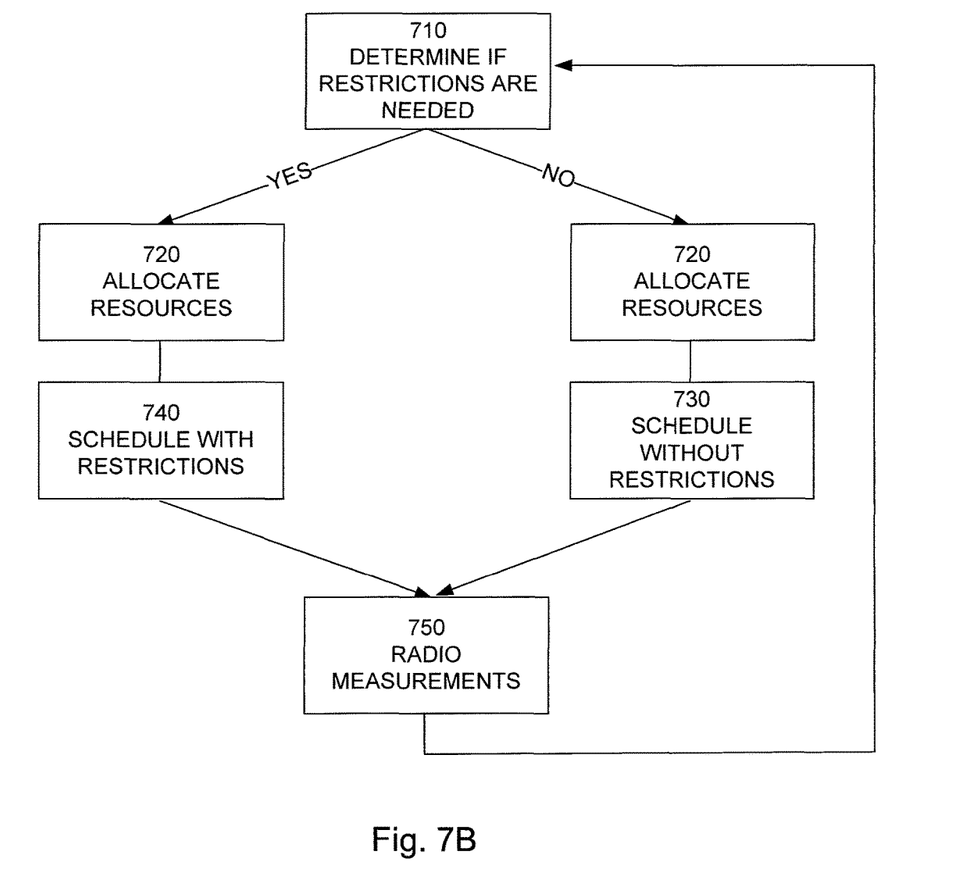

In one embodiment the network node 310 is arranged to select the scheduling policy based on radio measurements, see FIG. 7B. In case the first RF communication device 310 is capable of transmitting in uplink (or downlink) to the second RF communication device 325 and to the network node 310, then the network node 310 may also utilize certain radio measurements performed by the RF communication device 320 and/or the network node 310 to determine the most suitable scheduling policy. The radio measurements depict the impact of leakage due to a first transmission (e.g. first RF communication device 320 to second RF communication device 325) on the second transmission (e.g. first RF communication device 320 to network node 310) or vice versa.

The radio measurements may be made and transmitted (if needed) 750 to the network node 310, for example, after the end of a D2D resource allocation period (or during such a period in some embodiment) 720-740 or 720-730, and the network node 310 receives measurement report(s) from at least the first RF communication device 320.

The network node 310 may also be arranged to perform certain radio measurements, such as radio transmitter modulation quality, especially when a DL carrier frequency is used for D2D communication (i.e. between the first RF communication device 320 and the second RF communication device 325). In this case the first RF communication device 320 transmits on a DL frequency and also receives on the same frequency from the second RF communication device 325 with which it is performing D2D communication. Some examples of RF communication device or radio network node measurements related to the radio transmitter modulation quality are radio node TX error vector magnitude (EVM), carrier leakage, in-band emission level, etc.

The measurement report (valid for the first RF communication device 320 during a (first) time period) can include at least one of: a current (or average) D2D TX power and/or network node TX power level and/or current power imbalance between D2D TX power and network node TX power; information that a max allowed TX imbalance has been reached by the RF communication device 320; and D2D TX and/or network node TX modulation quality (e.g. Error Vector Magnitude, in-band emission, carrier leakage etc) or signal quality (e.g. SNR) quality during the first time period.

Furthermore, the network node 310 may also be arranged to estimate the modulation quality of the radio transmitter of the D2D TX and/or of D2D network node TX based on signal configuration e.g. type of modulation used, output power on D2D TX and/or network node TX, frequency of operation etc. This may be done in case the measurement report does not contain the modulation quality and may be performed as part of receiving the measurement reports 750.

Thereafter, the network node 310, determines whether the scheduling policy to the first RF communication device 320 need to be changed or not based (at least in part) on the measurement report and/or estimate measurements, by including the radio measurements in the determination 710 if restrictions are needed.

For instance the network node 310 may be configured to change to second scheduling policy if there is a risk for the TX imbalance to be larger than a third threshold. Such a risk may exist if a current (or average) D2D TX power and/or network node TX power level and/or current power imbalance between D2D TX power and network node TX power is larger than a first threshold. Such a risk may also exist if information that a max allowed TX imbalance has been reached by the RF communication device is set true. And such a risk may also exist if D2D TX and/or network node TX modulation quality (e.g. Error Vector Magnitude, in-band emission, carrier leakage etc) or signal quality (e.g. SNR) quality during the first time period is below a second threshold.

Furthermore, the first, second, and third thresholds may be determined based on device capability information (i.e. handling of TX imbalance) received from the RF communication device 320, or be based on the transmitted configuration message. In other words, the network node 310 may be configured to determine these thresholds based on a pre-determined configuration, or cell load, or device capability. One example of a first threshold value in terms of TX power imbalance is between 20 dB to 30 dB. The actually value of the threshold may be selected according to the RF communication device capability in terms of handling maximum TX power handling as stated above. The threshold in terms of RF communication device TX modulation quality (e.g. TX EVM) on any of the link (D2D TX and/or network node TX) can be 17% for QPSK (or 12% for 16 QAM) beyond which the network node 310 may decide to select the second scheduling policy.

Figure 7C:
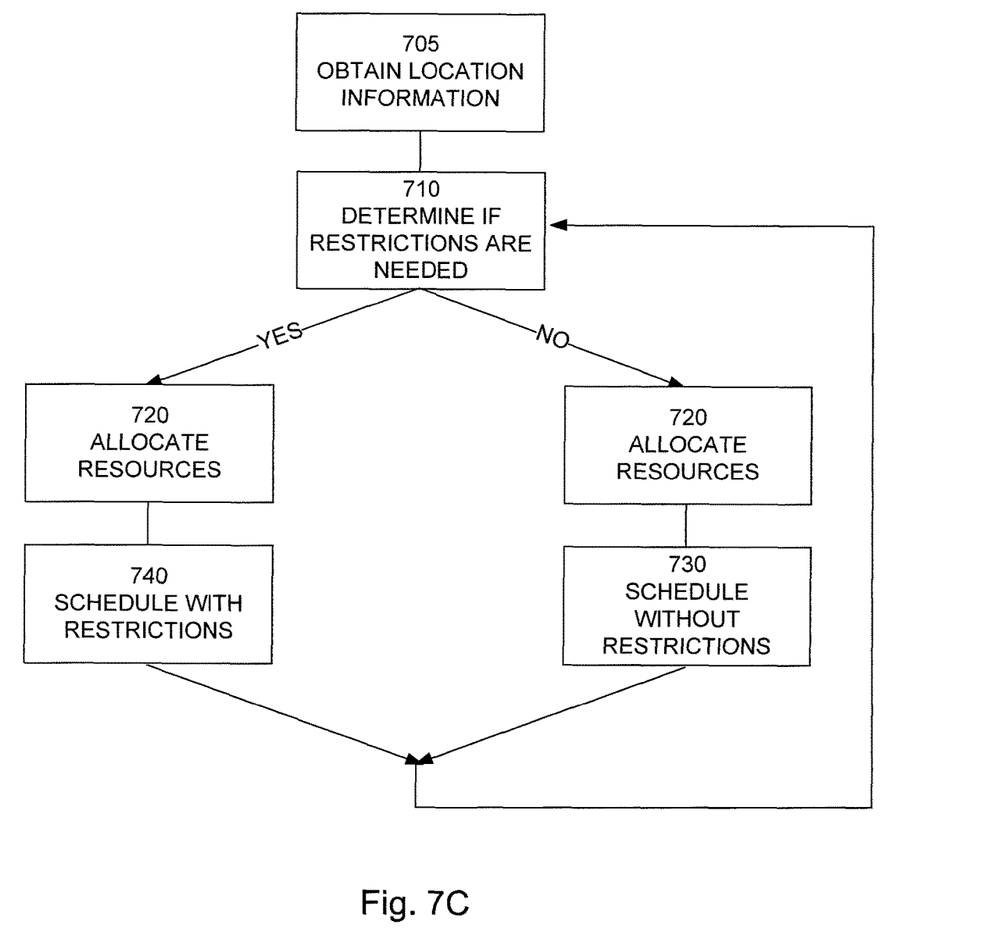

In one embodiment the network node 310 is configured to select the scheduling policy based on RF communication device location, see FIG. 7C.

The network node 310 may also be configured to obtain 705 location information associated with the RF communication devices 320, 325 involved in D2D communication to depict the TX imbalance between the RF communication device TX and network node TX power levels. The location information may comprises: location of the first RF communication device 320 with respect to the serving radio network node e.g. relative distance between first RF communication device 320 and the network node 310 or their respective locations and/or location of the first RF communication device 320 with respect to the second RF communication device 325 involved in D2D communication e.g. relative distance between the two devices or their locations.

The location information of the two RF communication devices 320, 325 involved in the D2D communication may comprise a location of the first RF communication device 320 for example geographical coordinates of the location of the first RF communication device 320 and a location of the second RF communication device 325 involved in D2D communication with the first RF communication device 310, for example geographical coordinates of the location of the second RF communication device 325.

The network node 310 is configured to retrieve the location information either from the RF communication device, by itself or from a location server (e.g. E-SMLC in LTE). The network node 310 is configured to retrieve the location information in a manner known in the field. Examples of such manners are: satellite based methods; Observed Time Difference Of Arrival (OTDOA); Uplink Time Difference Of Arrival (UTDOA); Enhanced cell ID (E-CID) and hybrid methods.

Based on any set of the above location information, the network node 310 is configured to determine the difference between the first distance (referenced L1 in FIG. 3) between the first RF communication device 320 and the network node 310 and the second distance (referenced L2 in FIG. 3) between the first RF communication device 320 and the second RF communication device 325. Alternatively the network node 310 may be configured to only determine whether first RF communication device 320 is close to the network node 310 or not (i.e. by using the location information) since typically the network node TX power is higher than the D2D TX power. If the difference in distances (i.e. using first or second set of location information), i.e. the difference between L1 and L2, is larger than a threshold then the TX power imbalance will be relatively larger and will cause leakage across the transmission from the link with the higher power to the link with the lower power. The determination of the distances may be performed as part of determining whether the restrictions are needed 710.

The network node 310 may alternatively or additionally be configured to query a distance-TX power table. The table may be arranged to map the difference in distances and the expected TX power imbalance in a given radio environment. The table may be pre-defined and/or obtained using experimental data and/or historical information. The table look up may be performed as part of determining whether the restrictions are needed 710.

If the difference in distances (or the implicitly determined TX power imbalance) is larger than a threshold the network node 310 may use the second scheduling policy to avoid the degradation of the transmitted signal on the link with lower power.

The network node 310 may additionally or alternatively be configured to determine a corresponding TX power difference between a first link (for example the first RF communication device 310 to second RF communication device 325) and a second link (for example the first RF communication device 310 to the network node 310) based on comparing signal strength measurements (e.g. RSRP, path loss etc) for the first link and the second link. The determination of the signal strengths may be performed as part of determining whether the restrictions are needed 710. For example, if the difference in signal strengths between the first link and the second link is above a threshold (e.g. 15 dB) then the network node 310 may assume that the TX power imbalance will be larger than certain power difference threshold (e.g. 20 dB). In this case the network node 310 restricts the resources according to the second scheduling policy to avoid degradation due to power leakage from a link with higher TX power to another link with lower TX power. The determination can be based on for example the signal strengths' difference between two links, expected RF communication device power levels on the D2D TX and network node TX links and also on quality targets (e.g. target SNR, BLER etc) at the radio receivers for both links.

The expected TX power imbalance can also be obtained from a table mapping the difference in the signal strengths between the two links and target signal quality for the two links to the expected power imbalance between these. Such a table may be pre-defined and/or be determined from experimental data or historical information which is applicable in a given radio environment.

Figure 7D:
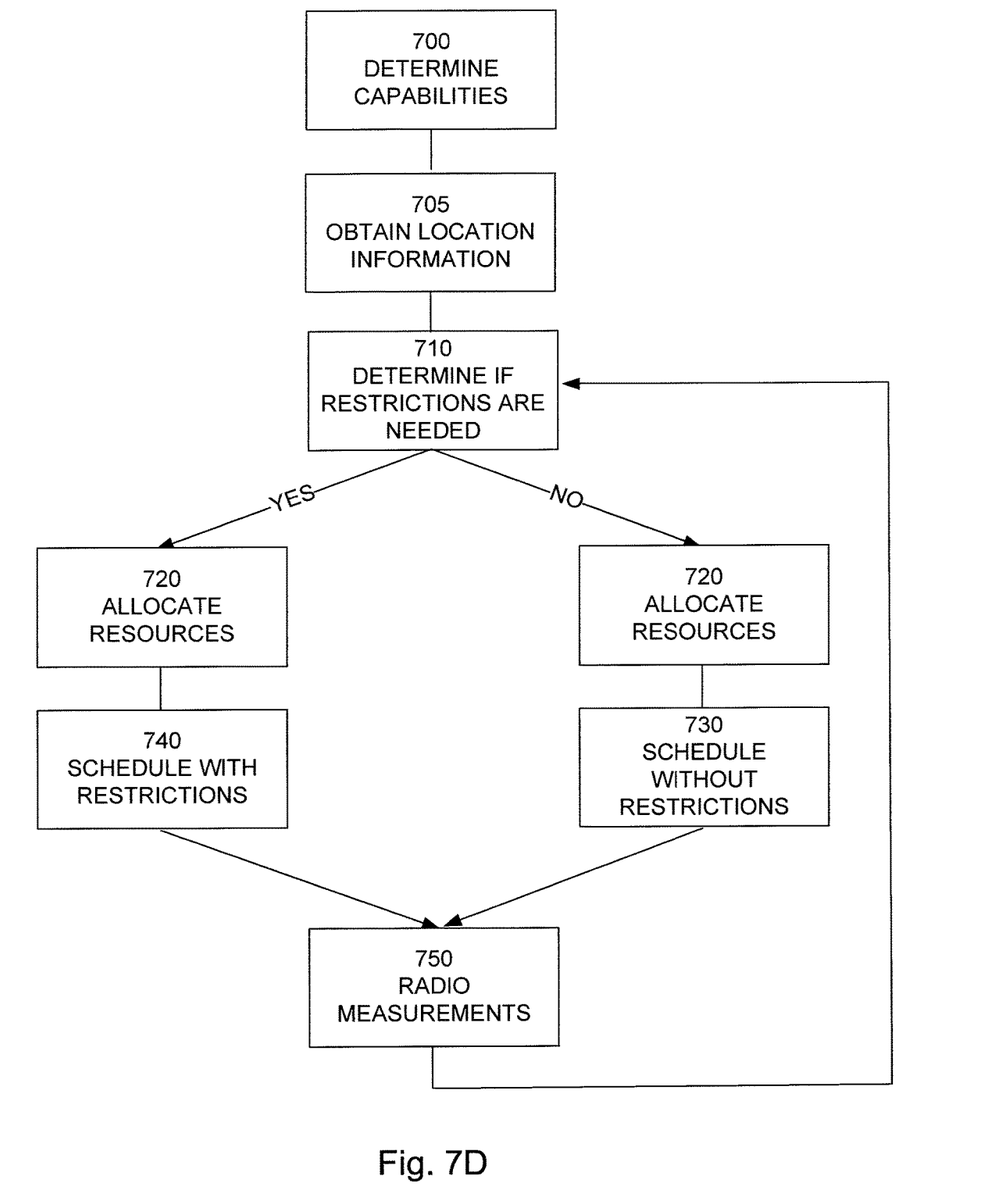

Combinations, of the manners of determining a scheduling policy, are of course also possible, see FIG. 7D. The network node 310 may be configured to select a suitable the policy for resource assignment to the D2D capable RF communication device, that is, to determine if restrictions are needed, based on more than one criterion. Therefore any combination of the criteria described in the above may be used for selecting the scheduling policy.

For example if the RF communication device 320 is capable of handling TX power imbalance as indicated by its capability information then the network node 310 may decide to select the first scheduling policy for resource assignment provided the TX EVM on both links of the RF communication device 320 is below certain thresholds (e.g. below 16% for QPSK) and also if the RF communication device 320 is located close to the serving network node as indicated by the location information or other indication (e.g. signal strength of the network node TX link is −80 dBm lower than the signal strength of the D2D link).

To further improve the allocation of resources, the RF communication device 320 is configured to recommending a suitable scheduling policy to the network node.

The D2D capable RF communication device 320 (i.e. first RF communication device) is be configured to assess whether transmissions on the two links (i.e. D2D and network node TX) is suitable according to the first scheduling policy or second scheduling policy or any policies for transmissions on the two links. This assessment may be effected prior to establishment of both links and/or during an ongoing communication. The RF communication device 320 may transmit the results of the assessment as a recommendation to the network node 310.

In one embodiment the RF communication device 320 is configured to perform the above assessment using one or more criteria as described with reference to the network node. Examples of such criteria are the RF communication device's 320 capability of handling simultaneous D2D and network node TX operations, RF communication device radio measurements, RF communication device TX modulation quality, RF communication device location with respect to the network node 310 and/or the second RF communication device 325 with which the first RF communication device 320 is involved in D2D communication with. For example, if the TX power imbalance between the two links is above a threshold (e.g. 20 dB or more) then the RF communication device 320 may recommend the use of second scheduling policy for transmissions on its D2D TX and network node TX links.

In one embodiment the RF communication device 320 is configured to perform the above assessment autonomously, based on pre-defined rules, according to a configuration received from the network node 310 and/or when requested by the network node 310 to carry out the assessment. For example the pre-defined rule can be that the RF communication device 320 shall initiate assessment when certain radio measurement (e.g. transmission power, TX EVM etc) and/or bit rate on any of the links or their differences between the two links exceed above their respect thresholds. In another example the pre-defined rule can be that the RF communication device 320 shall initiate assessment when the signal strength (e.g. RSRP, Path Loss etc. (between the network node 310 and the RF communication device 320 exceeds a certain threshold (e.g. RSRP falls below −90 dBm). In case of network node configuration the network node 310 may also configure the RF communication device 320 with the radio measurement, criteria and thresholds which should be used by the RF communication device to perform the assessment of the policy.

The network node 310 may be configured to select the most suitable scheduling policy while taking into account the received recommendation from the RF communication device 320. This may be performed as part of the determination if restrictions are needed 710. The network node 310 may further take into account the results of its own assessment according to criteria/procedures disclosed in the above. For example the network node 310 may select the scheduling policy (e.g. first policy) if it is recommended by the RF communication device as well as it is also assessed by the network node 310 itself. If the two scheduling policies don't match then the network node 310 may select the second scheduling policy (assessed by the network node 310). This ensures that the RF communication device TX operation on D2D TX link and/or network node TX link is not degraded.

The network node 310 uses a suitable criterion or multiple criteria to select the scheduling policy for each pair of D2D RF communication devices 320, 325 involved in D2D communication and/or uses the received recommendation from the RF communication device 320 according to above to further improve the decision.

After the selection, the network node 310 configures the RF communication devices 320, 325 intended to initiate D2D communication with the parameters associated with the selected policy. If the D2D communication is in progress and the selected policy differs from the policy currently used, then the network node 310 reconfigures them (i.e. changes the policy) with the parameters associated with the selected policy.

In one embodiment the two scheduling policies are pre-defined. The network node 310 may be configured to explicitly indicate (e.g. send an indicator) to the RF communication device 320 whether the RF communication device 320 has to operate using the first or the second scheduling policy. The network node 310 further configures the RF communication device 320 with the parameters associated with the selected policy as indicated by the said indicator.

For example if the first policy is selected, the network node configures the first and second RF communication devices with the resources (e.g. subframes, RBs in assigned subframes) for performing D2D communication and for transmission for network node TX.

The network node 310 is configured to use the so-called mode selection occasions (typically on the time scale of 200-500 ms as discussed above) to select and signal the scheduling policy to the device. However, the network node 310 may be configured to also take into account the device capability if the device capabilities do not support simultaneous D2D and network transmission, then the network node does not perform continuous policy evaluation and does not signal such scheduling policy information at a mode selection occasion; otherwise, the network node 310 may re-evaluate the scheduling policy either periodically (e.g. at each mode selection occasion) or on an event triggered basis, for example when the device reports low power headroom or high buffer status at buffer status reporting (such reports would be known to the skilled person).

Alternatively, the network node 310 may be configured to autonomously decide not to re-evaluate the scheduling policy for a given RF communication device, based on e.g. known device history (e.g. stationary sensor or meter with known communication need and pattern).

After receiving the new configuration parameters from the network node 310, the RF communication device 320 starts effecting the D2D TX and network node TX transmissions according to the selected policy. This RF communication device behavior is similar to the existing RF communication device behavior upon the reception of the mode selection command from the network node 310 (as is known by the skilled person), with the new addition, that the device also takes into account the specific command on the updated scheduling policy. For example, if the device is allowed (by the network node 310) to use a PRB for the D2D communication during the next 500 ms and the device is scheduled by the network node 310 momentarily on an adjacent PRB for network transmission, then the RF communication device 320 must take into account the currently valid scheduling policy. If the scheduling policy does not allow the simultaneous use of an adjacent PRB, then the RF communication device 320 must refrain from using that PRB during that particular subframe. Note that since the network node 310 does not control the D2D resources on a TTI (ms) basis, this decision must be made by the RF communication device 320 taking into account the current scheduling policy. If the scheduling policy allows the simultaneous use of adjacent PRBs, the device may use these PRBs in the same subframe. In other words, the RF communication device 320 is configured to receive allocated resources from the network node 310 and to determine if said received allocated resources are compatible with a current scheduling policy and configure its communication with said network node 310 and said second RF communication device 325 accordingly.

The teachings herein shows a solution to the problems that may arise due to TX imbalance in case a RF communication device, in network assisted D2D communication needs to transmit both to the network node and to another RF communication device in the same sub frame. The proposed solutions give advantages over the prior art. One advantage being that simultaneous transmission is only avoided when so is really necessary. Another advantage is that the teachings enable flexible scheduling in the network node which optimizes the spectrum usage which leads to improved capacity.

The method also enables the network node to more efficiently utilize the resources and manage the load of users (D2D and legacy users' operation) by selecting the most suitable scheduling policy for the RF communication device for transmissions in its D2D TX and network node TX links.

In the description above there has been focus on an LTE system and OFDM, but the teachings herein are not limited to this case. Furthermore, the denominator network node may be an eNode B, node B, Base Station, wireless access point (AP), base station controller, relay, donor node controlling relay, base transceiver station (BTS), transmission points, transmission nodes, RRU, RRH, nodes in distributed antenna system (DAS) etc. Furthermore, a RF communication device may be an UE, sensor, lap top modem, smart phone, machine type (MTC) device, PDA, iPAD, Tablet, smart phone, laptop embedded equipped (LEE), laptop mounted equipment (LME), USB dongles etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A network node comprising a radio frequency communications interface and a controller, said network node being configured to service at least one first radio frequency communication device being configured for both network communication and for device-to-device communication with a second radio frequency communication device, wherein said controller is configured to:
   determine if a restriction of a scheduling policy is necessary for said first radio frequency communication device;
   select a scheduling policy accordingly; and
   allocate communication resources according to said selected scheduling policy to said first radio frequency communication device,
   wherein if it is determined said restriction of said scheduling policy is not necessary, then said scheduling policy is one which enables network communication and device-to-device communication in said same transmission time interval, and if it is determined said restriction of said scheduling policy is necessary, then said scheduling policy is one which enables either network communication or device-to-device communication in said same transmission time interval; and
   receive a recommendation on a scheduling policy from said first radio frequency communication device and to base said determination if a restriction of said scheduling policy is necessary on said recommendation;
   configure the first radio frequency communication device for generating said recommendation based on such configuration;
   only transmit said allocated resources to said first radio frequency communication device during a mode selection occasion if the scheduling policy enables simultaneous network communication and device-to-device communication in said same transmission time interval.

2. The network node according to claim 1, wherein said transmission time interval is a subframe.

3. The network node according to claim 1, wherein said controller is further configured to determine a capability of said first radio frequency communication device, which capability indicates that the first radio frequency communication device is capable of performing simultaneous network communication and device-to-device communication in the same transmission time interval; and
   determine if said restriction of said scheduling policy is necessary based on said capability of said first radio frequency communication device.

4. The network node according to claim 3, wherein the capability information further comprises one or more of a) information of capability of simultaneously transmitting signals b) Maximum allowed D2D/network TX power imbalance handling capability; and c) in-band emission level handling support.

5. The network node according to claim 1, wherein said controller is further configured to base said determination if a restriction of said scheduling policy is necessary on radio measurements for said first radio frequency communication device.

6. The network node according to claim 5, wherein said controller is further configured to generate said radio measurements by performing measurements or by estimating said radio measurements.

7. The network node according to claim 5, wherein said controller is further configured to receive said radio measurements from said first radio frequency communication device.

8. The network node according to claim 1, wherein said controller is further configured to obtain location information on said first radio frequency communication device and to base said determination if a restriction of said scheduling policy is necessary based on said location information.

9. The network node according to claim 8, wherein said location information comprises a location of said first radio frequency communication device or a relative distance of said first radio frequency communication device.

10. The network node according to claim 1, wherein said controller is further configured to base said determination if a restriction of said scheduling policy is necessary based on a load of network cell of said network node.

11. The network node according to claim 1, wherein said controller is further configured to transmit said allocated resources to said first radio frequency communication device during a mode selection occasion wherein the network node selects and signals the scheduling policy to said first radio frequency communication device.

12. The network node according to claim 1, wherein said controller is further configured to determine if a restriction of said scheduling policy is necessary periodically.

13. The network node according to claim 1, wherein said controller is further configured to detect a triggering event and, in response thereto, determine if a restriction of said scheduling policy is necessary.

14. The network node according to claim 1, wherein said controller is further configured to allocate communication resources according to said selected scheduling policy to said first radio frequency communication device by transmitting an indication of which one of a plurality of pre-defined scheduling policies, the first radio frequency communication device should utilize.

15. A method for use in a network node configured to service at least one first radio frequency communication device being configured for both network communication and for device-to-device communication with a second radio frequency communication device, said method comprising:
determining if a restriction of a scheduling policy is necessary for said first radio frequency communication device;
selecting a scheduling policy accordingly; and
allocating communication resources according to said selected scheduling policy to said first radio frequency communication device,
wherein if it is determined said restriction of said scheduling policy is not necessary, then said scheduling policy is one which enables network communication and device-to-device communication in said same transmission time interval, and if it is determined said restriction of said scheduling policy is necessary, then said scheduling policy is one which enables either network communication or device-to-device communication in said same transmission time interval; and
receiving a recommendation on a scheduling policy from said first radio frequency communication device and to base said determination if a restriction of said scheduling policy is necessary on said recommendation;
configuring the first radio frequency communication device for generating said recommendation based on such configuration;
transmitting only said allocated resources to said first radio frequency communication device during a mode selection occasion if the scheduling policy enables simultaneous network communication and device-to-device communication in said same transmission time interval.

16. A first radio frequency communication device comprising a radio frequency communications interface and a controller, wherein said controller is configured to:
establish a network communication link with a network node and said first radio frequency communication device and to:
establish a device-to-device communication link with a second radio frequency communication device and said first radio frequency communication device via said RF communication interface;
assess whether transmission on both of said network communication link with said network node and said first radio frequency communication device, and said device-to-device communication link with said second radio frequency communication device and said first radio frequency communication device is suitable according to a scheduling policy;
generate a recommendation on said scheduling policy based on said assessment; and to:
transmit said recommendation to said network node; and
perform said assessment prior to establishment of both of said network communication link with said network node and said first radio frequency communication device, and said device-to-device communication link with said second radio frequency communication device and said first radio frequency communication device; wherein said assessment is performed autonomously based on pre-defined rules.

17. The first radio frequency communication device according to claim 16, wherein said controller is further configured to perform said assessment during ongoing communication.

18. The first radio frequency communication device according to claim 16, wherein said controller is configured to perform said assessment autonomously, based on pre-defined rules, according to a configuration received from the network node and/or when requested by the network node to carry out the assessment.

19. The first radio frequency communication device according to claim 16, wherein said controller is configured to receive allocated resources from said network node and to determine if said received allocated resources are compatible with a current scheduling policy and configure its communication with said network node and said second radio frequency communication device accordingly.

20. The first radio frequency communication device according to claim 16, wherein said controller is configured to signal information about a capability to said network node, which capability indicates that the first radio frequency communication device is capable of performing simultaneous network communication and device-to-device communication in the same transmission time interval.

21. A method for use in a first radio frequency communication device comprising a radio frequency communications interface and a controller, said method comprising:

establishing a network communication link with a network node and said first radio frequency communication device;

establishing a device-to-device communication link with a second radio frequency communication device and said first radio frequency communication device via said RF communication interface;

assessing whether transmission on both of said network communication link with said network node and said first radio frequency communication device, and said device-to-device communication link with said second radio frequency communication device and said first radio frequency communication device is suitable according to a scheduling policy;

generating a recommendation on said scheduling policy based on said assessment; and transmitting said recommendation to said network node; and performing said assessment prior to establishment of both of said network communication link with said network node and said first radio frequency communication device, and said device-to-device communication link with said second radio frequency communication device and said first radio frequency communication device; wherein said assessment is performed autonomously based on pre-defined rules.

22. A computer readable storage medium encoded with instructions that, when loaded and executed on a processor, causes the method according to claim 15 to be performed.

* * * * *